United States Patent [19]

Gehl et al.

[11] 4,304,580
[45] Dec. 8, 1981

[54] AIR CLEANER WITH SUSPENDED CARTRIDGE

[75] Inventors: Warren G. Gehl, Richfield; Mervin E. Wright, Apple Valley, both of Minn.

[73] Assignee: Donaldson Company, Inc., Minneapolis, Minn.

[21] Appl. No.: 175,255

[22] Filed: Aug. 4, 1980

[51] Int. Cl.³ .................... B01D 27/06; B01D 46/24
[52] U.S. Cl. ........................... 55/482; 55/492; 55/498; 55/502; 55/507; 210/338; 210/453; 210/455
[58] Field of Search ............... 55/482, 492, 498, 502, 55/503, 505, 507, 510; 210/450, 453, 455, 459, 489, 338

[56] References Cited

U.S. PATENT DOCUMENTS

| | | | |
|---|---|---|---|
| 3,724,179 | 4/1973 | Leinfelt | 55/507 |
| 4,007,026 | 2/1977 | Groh | 55/502 |
| 4,135,899 | 1/1979 | Gauer | 55/502 |
| 4,151,095 | 4/1979 | Wright | 55/498 |
| 4,159,197 | 6/1979 | Schuler | 55/502 |
| 4,211,543 | 7/1980 | Tokar et al. | 55/502 |

FOREIGN PATENT DOCUMENTS 2840628  3/1979  Fed. Rep. of Germany ........ 55/502

*Primary Examiner*—David L. Lacey
*Attorney, Agent, or Firm*—Merchant, Gould, Smith, Edell, Welter & Schmidt

[57] ABSTRACT

An air cleaner which includes a support (23) having a first concave conical surface (26) and compression means (50) extending along the axis of said surface away from the apex of said surface; an hollow inner filter (37) including a first end cap (41) with a rim (43) defining a first convex conical surface having the same apex angle as said first concave surface, and a second end cap (42) for axial engagement by said compression means; and a hollow, outer filter (32) including an end cap (57) with a resilient lip (61) extending inwardly to be sealingly received between said conical surfaces when said compression means engages said second end cap. The second end cap of the inner filter may have a second convex conical surface (47), and the outer filter may have a second end cap with a resilient lip extending to be sealingly engaged by the second convex conical surface.

6 Claims, 3 Drawing Figures

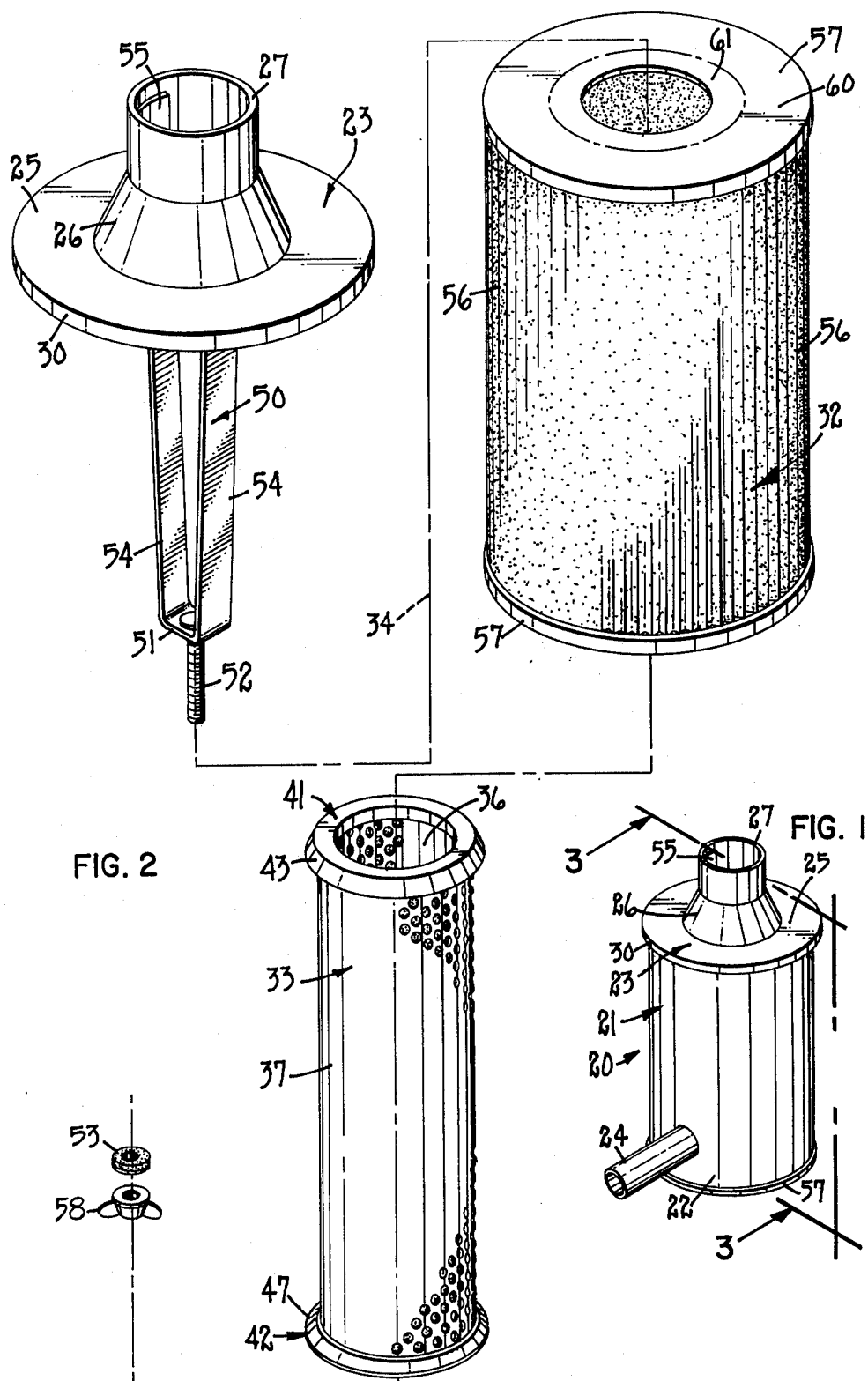

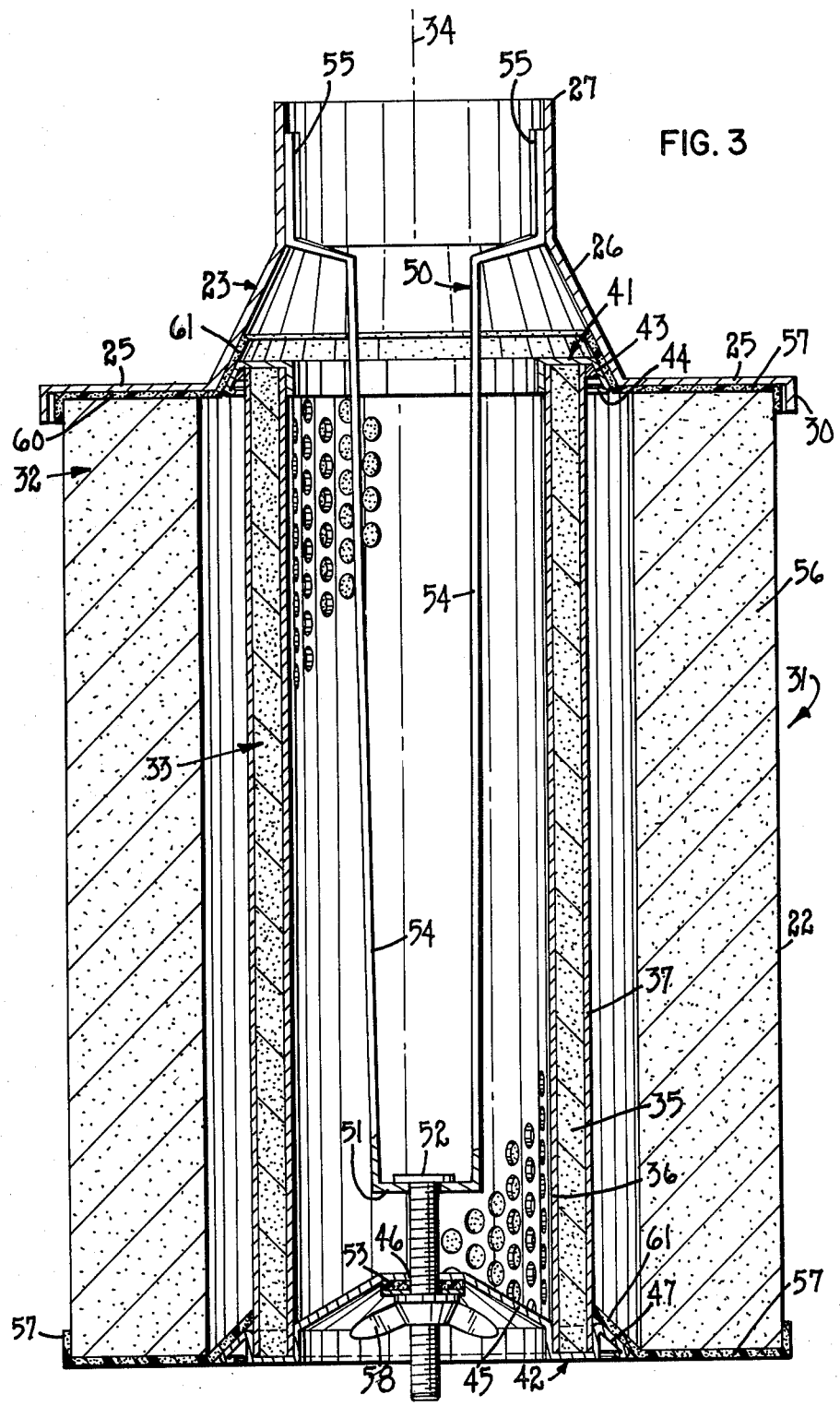

4,304,580

AIR CLEANER WITH SUSPENDED CARTRIDGE

TECHNICAL FIELD

This invention relates to the field of air cleaners having replaceable filter cartridges, and particularly to such cleaners having both principal and safety filter functions so that the engine or other device being supplied with cleaned air is not directly open to the ambient atmosphere even if a principal filter undergoes catastrophic failure.

BACKGROUND OF PRIOR ART

An air cleaner for the contemplated use conventionally comprises a housing having air inlet and outlet ports, an outer, principal filter cartridge and an inner, safety filter cartridge. Typically, the outlet port is central or axial, and air flows inward radially through the cartridges. The latter are usually mounted in the housing by means of a central support yoke, being clamped between an end of the housing and a closure member centrally traversed by an extremity of the yoke.

This is a sturdy and practical arrangement, and one which is quite satisfactory when the filter cartridges are substantial enough to tolerate the necessary axial compressive forces without deterioration. For this purpose, the filter cartridges, in which the medium itself may be pleated paper, are so constructed that the paper is contained between inner and outer cylindrical supporting and protective shells of perforated metal, extending between end caps like the paper medium itself.

It becomes increasingly desirable, however, to make at least the principal filter cartridge without the perforated metal shells. These cartridges are simply removed and discarded when they become filled with dirt, and the cost of this procedure is considerably increased if metal shells must be discarded with the paper medium. Since the safety filters seldom require replacement, the expense of providing them with inner and outer shells is not intolerable.

In the co-pending application of Michael Fox, Ser. No. 171,658, filed on July 24, 1980 and assigned to the assignee of the present application, an arrangement is shown in which an outer filter cartridge is provided with flexible end lips and means are provided for gripping the flexible lips by contact with the ends of the inner filter, so that the outer filter is not compressed axially but simply gripped at the lips for support. This arrangement is somewhat inconvenient to assemble, and the present invention comprises an improvement thereover.

BRIEF SUMMARY OF THE INVENTION

In this invention an outer filter cartridge is provided with flexible lips, an inner filter cartridge is provided with convex conical end surfaces, and a support member is provided with a concave conical surface. Engagement of the flexible lips with the conical surface suspends and stabilizes the outer filter cartridge, and the conical surfaces facilitate the assembly of the device initially and when filter cartridges must be replaced.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, wherein like reference numerals indicate corresponding parts throughout the several views, FIG. 1 is a general view in perspective of an air cleaner according to the invention;

FIG. 2 is an exploded view of the cleaner, parts being omitted; and

FIG. 3 is a longitudinal axial section of the filter assembly as seen from the line 3—3 of FIG. 1.

DESCRIPTION OF THE PREFERRED EMBODIMENT

In FIG. 1, an air cleaner 20 according to the invention is shown to comprise a housing 21 including a body 22 and an end closure or support 23. Ambient air is admitted into the cleaner by an inlet 24 in body 22: the air inlet may be radial or tangential, as desired. Closure 23 has a flat portion 25 joined by a conical flairing portion 26 to an outlet 27 for cleaned air, and a rim 30 for connection to body 22 by suitable fasteners.

Housing 21 contains a filter assembly comprising, with closure 23, an outer, principal filter cartridge 32 and an inner, safety filter cartridge 33, coaxial on the axis 34 of the housing.

Safety filter cartridge 33 comprises a hollow cylinder 35 of pleated paper filter medium, the pleats running parallel to axis 34, and being confined between an inner shell 36 and an outer shell 37 of perforated metal of sufficiently heavy gauge to withstand considerable compression forces along axis 34. Paper cylinder 35 and shells 36 and 37 are secured by a suitable cement or plastic into an upper end cap 41 and a lower end cap 42, to form a unitary structure which is physically quite substantial and resistant to compression force along axis 34.

End cap 41 is annular and has a convex conical surface 43 with a rim 44 inturned toward axis 34. End cap 42 is in the form of a disk having a central upwardly dished portion 45 with a central aperture 46 and a rim formed as a convex conical surface 47 tapered in the same direction as surface 43 of end cap 41.

Closure 23 includes compression means in the form of a support yoke 50 of elongated, generally U-shaped configuration having a central portion 51 to which a threaded axial member 52 is secured to extend through aperture 46 in end cap 42 and receive a gasket washer 53 and wing nut 58. A leg 54 extends generally axially from each end of portion 51, and is formed at its end 55 for securement as by welding to the inner surface of outlet 27.

Principal filter cartridge 32 is shown in FIGS. 2 and 3 to comprise a hollow cylinder 56 of pleated paper filter medium, the pleats running parallel to axis 34. The ends of the paper are molded into identical end caps 57 so that the cartridge is reversably receivable in housing 21. Each end cap 57 comprises a plastic annulus 60 and a lip 61 extending radially and inwardly therefrom. The annulus and lip are molded integrally, but are of plastic of different durometers, annulus 60 being quite rigid and securing the ends of cylinder 56, while lip 61 is very elastic and flexible.

When the filter is assembled annulus 60 of the upper end cap 57 engages the inner surface of flat portion 25 of closure 23, while the lip itself is clamped between the inner concave surface of conical portion 26 and the outer convex surface 43 of end cap 41, so that the principal filter is sealingly supported by the lip 61. At the bottom of the assembly, lip 61 engages the convex conical surface 47 of end cap 42 resiliently, to center and seal cartridge 32 with respect to cartridge 33 and axis 34, and to damp transverse vibration between the cartridges.

Operation

To assemble an air cleaner according to the invention, a safety filter cartridge 33 is placed on a firm surface, with end cap 41 uppermost. A principal filter cartridge 32 is then placed with its lower lip 61 engaging conical surface 43 and forced downward until the lip expands and end cap passes within the outer cartridge. Because of the flexibility of lip 61 the compression force on cartridge 32 necessary to accomplish this is not damaging to cartridge 32, which is then lowered until its upper and lower lips 61 engage surfaces 43 and 47 respectively. The assembly is now positioned in the cleaner so that member 52 passes through aperture 46 in end cap 42, and washer 53 and wing nut 58 are applied.

As the wing nut is tightened, upward force is applied to end cap 42 and through safety filter cartridge 33 to end cap 41, which grips lip 61 against the inner surface 26, lower lip 61 resiliently engaging surface 47 of end cap 42. The dimensions of the various parts are such that the only axial compressive force applied to the principal filter cartridge 32 is a negligible force due to the resilience of lower lip 61. Housing 21 may now be positioned and secured to end member 23, any inlet conduit needed being secured at inlet 24. Air flow from inlet 24 to outlet 27 results in particulate airborne matter being collected in the outside of cartridge 32.

When it is desired to renew the principal filter cartridge, the housing is opened, wing nut 58 is removed, and the assembly of filter cartridges 32 and 33 is removed from support 50. Cartridge 33 is forced out of cartridge 32 by reversal of the process just described, so that cartrige 32 may be discarded, the process being facilitated by inturned portion 44 of end cap 41, and a replacement is installed.

From the foregoing it is evident that we have invented an air cleaner structure in which a filter cartridge is supported principally at one end without significant axial compression, and yet is easily applied and removed from an associated inner filter cartridge by reason of the conical configuration of the latter's end caps.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. An air cleaner comprising, in combination:
    a support having a first concave conical surface, compression means extending along the longitudinal axis of said surface away from the apex of said surface and outlet means for releasing filtered air from said cleaner;
    a hollow inner filter surrounding the longitudinal axis of said support, said inner filter including a first end cap, with a rim defining a first convex conical surface having the same apex angle as said first concave surface and positioned adjacent said first concave surface, and a second end cap which is in axial engagement by said compression means; and
    a hollow outer filter positioned substantially around said inner filter, said outer filter including a first end cap with a resilient lip extending inwardly so as to be sealingly received between said conical surfaces due to said compression means engaging said second end cap and air inlet means for introducing unfiltered air flow into said cleaner.

2. An air cleaner according to claim 1 in which said inner filter is constructed and arranged to resist compression forces along said axis, and said outer filter is constructed and arranged to be effected by compression forces.

3. An air cleaner according to claim 1 in which said second end cap of said inner filter includes a second rim defining a second convex conical surface spaced axially from said first conical surface,
    and said outer filter includes a second end cap with a second resilient lip extending inwardly and sealingly engaged by said second convex conical surface,
    the axial distance between said lips being substantially the same as the axial spacing of said rims, whereby respective adjacent lip and rim surfaces resiliently engage each other.

4. An air cleaner according to claim 3 in which the apices of all of said conical surfaces lie in the same direction along said axis.

5. An air cleaner according to claim 3 in which said second lip of said outer filter is dimensioned and constructed to resiliently enable passage of said first end cap of said inner filter therethrough.

6. An air cleaner according to claim 5 in which said first end cap of said inner filter is designed and constructed to facilitate axial movement of said cap past the first named resilient lip of said outer filter in reverse directions along said axis.

* * * * *